(No Model.)

T. W. FEELEY

PROCESS OF MANUFACTURING GEM SETTINGS.

No. 261,542. Patented July 25, 1882.

WITNESSES:

INVENTOR:

UNITED STATES PATENT OFFICE.

THOMAS W. FEELEY, OF PROVIDENCE, RHODE ISLAND.

PROCESS OF MANUFACTURING GEM-SETTINGS.

SPECIFICATION forming part of Letters Patent No. 261,542, dated July 25, 1882.

Application filed January 28, 1882. (No model.)

*To all whom it may concern:*

Be it known that I, THOMAS W. FEELEY, of the city and county of Providence, in the State of Rhode Island, have invented a new and Improved Process of Manufacturing Gem-Settings; and I declare the following to be a specification thereof, reference being had to the accompanying drawings.

Like letters indicate like parts.

Figure 1:
Figure 2:
Figure 3:
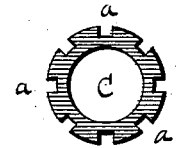
Figure 4:
Figure 5:
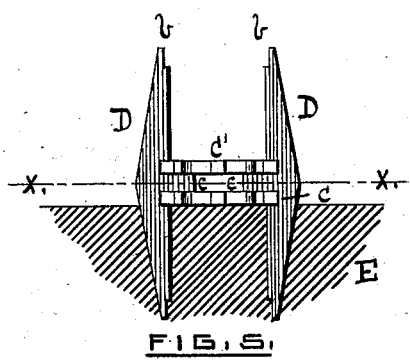
Figure 6:
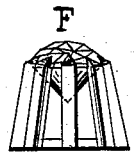

Figure 1 shows a blank ring of sheet metal. Fig. 2 shows a number of the rings in position upon an arbor, whereon they are slotted. Fig. 3 shows the slotted ring ready to be soldered to the prongs. Fig. 4 is a plan of my improved double-end prong. Fig. 5 illustrates the process of soldering the double prongs to the rings. Fig. 6 is a side elevation of the finished setting with the gem in position.

My invention relates to the manufacture of settings to confine gems and precious stones for jewelry; and it consists in constructing a double setting by means of double-end prongs of a peculiar shape soldered to slotted rings, and cutting asunder such double setting when finished, thereby forming two single settings, as hereinafter particularly specified.

I cut from sheet metal rings A, of the shape of washers, and place them snugly in contact upon an arbor, B, and there confine them, while I burr upon their outer circumference transversely a series of rectangular slots, $a$, as shown in Fig. 2. The product of this operation is a series of slotted rings, C.

The prongs D are cut from sheet metal. Each end is notched or shouldered, as shown at $b$. The outer edge tapers from the central point toward the ends, and the inner edge is preferably straight, having at its central point a rectangular projection, $c$, as fully shown in Fig. 4.

In soldering the rings and prongs together I prefer to use a block, E, having slots suitable to receive about one-half of the length of the prong, and supporting upon its surface one of the rings C. Having laid upon the block E one of the rings C, I insert two of the prongs D into the block E until the projections $c\,c$ rest upon the ring C. I then slip on another slotted ring (which in Fig. 5 I designate as C') upon the prongs D D, the ring C' resting upon the upper edge of the projections $c\,c$. These projections $c\,c$ thus serve to keep the rings C C' apart and parallel to each other. I now apply the solder to each of the projections $c\,c$, and it flows at the same time upon both the rings C C', uniting them to each of the prongs D D. I now have a firm stiff structure, which I can freely handle in fixing the other prongs D in the respective slots $a$ of the rings C C', soldering them upon the several projections $c\,c$ to both rings at the same time, as before described. Having soldered all the prongs to the rings, I have produced a double setting, which I saw in two on the line $x\,x$ of Fig. 5, and each part forms a single setting, the base of which I grind and burnish down to remove the remnants of the projections $c\,c$ and the superfluous solder, thus giving a proper finish to the setting. The gem F is inclosed in the notches $b$ of the prongs in the usual manner. Thus by means of the double-end prongs and the central projections, $c\,c$, to serve as blocks to keep the rings C C' in proper position and relation to each other, I can make at the same time two settings with the same soldering hitherto required for one, so reducing the labor and expense in the aggregate result.

I claim as a novel and useful invention and desire to secure by Letters Patent—

The improved process of constructing gem-settings herein described, consisting in soldering double-end prongs D D to slotted rings C C by flowing solder upon the projections $c\,c$ of said prongs into contact with said prongs and rings at the places of their engagement, and sawing asunder the double setting so formed and finishing each part into a single gem-setting, substantially as specified.

THOMAS W. FEELEY.

Witnesses:
WM. B. W. HALLETT,
WARREN R. PERCE.